United States Patent
Park et al.

(10) Patent No.: US 12,116,307 B2
(45) Date of Patent: Oct. 15, 2024

(54) JIG FOR MANUFACTURING WINDOW AND METHOD OF MANUFACTURING WINDOW USING THE SAME

(71) Applicants: Samsung Display Co., Ltd., Yongin-si (KR); DOWOOINSYS CO., LTD., Cheongju-si (KR)

(72) Inventors: Hanggyun Park, Suwon-si (KR); Beomsoo Kim, Cheonan-si (KR); Byungchan Kim, Hwaseong-si (KR); Jang Doo Lee, Hwaseong-si (KR); Seungjun Yi, Suwon-si (KR); Hyungsup Lee, Yongin-si (KR); Sunhong Choi, Cheonan-si (KR)

(73) Assignees: Samsung Display Co., Ltd., Yongin-si (KR); Dowooinsys Co., Ltd., Cheongju-si (KR)

( * ) Notice: Subject to any disclaimer, the term of this patent is extended or adjusted under 35 U.S.C. 154(b) by 42 days.

(21) Appl. No.: 17/586,589

(22) Filed: Jan. 27, 2022

(65) Prior Publication Data
US 2022/0250969 A1    Aug. 11, 2022

(30) Foreign Application Priority Data
Feb. 9, 2021    (KR) .......................... 10-2021-0018085

(51) Int. Cl.
*C03C 15/00*    (2006.01)
*C03B 33/02*    (2006.01)

(52) U.S. Cl.
CPC .......... *C03C 15/00* (2013.01); *C03B 33/0222* (2013.01)

(58) Field of Classification Search
None
See application file for complete search history.

(56) References Cited

U.S. PATENT DOCUMENTS

| | | | | |
|---|---|---|---|---|
| 3,373,064 | A * | 3/1968 | Junge | H01J 29/24 156/345.19 |
| 5,650,075 | A * | 7/1997 | Haas | H03H 3/02 216/97 |
| 5,730,162 | A * | 3/1998 | Shindo | H01L 21/67781 414/937 |
| 9,040,147 | B2 * | 5/2015 | Hashimoto | C03C 21/002 428/156 |
| 9,656,910 | B2 * | 5/2017 | Bazemore | B23K 26/361 |

(Continued)

FOREIGN PATENT DOCUMENTS

| | | | | |
|---|---|---|---|---|
| CN | 107250073 B | * | 10/2020 | ......... B23K 26/0006 |
| KR | 10-1102518 B1 | | 1/2012 | |

(Continued)

OTHER PUBLICATIONS

Machine Translation of KR-102091355 B1; (Year: 2020).*

*Primary Examiner* — Shamim Ahmed
(74) *Attorney, Agent, or Firm* — Lewis Roca Rothgerber Christie LLP (57) ABSTRACT

A jig and a method of manufacturing a window are provided. A jig includes a lower plate having a plurality of cell regions and a peripheral region dividing the plurality of cell regions, an intermediate plate on the lower plate and in which a plurality of openings corresponding to the plurality of cell regions is defined, and an upper plate on the intermediate plate, and a glass substrate is fixed between the intermediate plate and the upper plate.

10 Claims, 9 Drawing Sheets

(56) References Cited

U.S. PATENT DOCUMENTS

| | | | |
|---|---|---|---|
| 2007/0041812 A1* | 2/2007 | Tokuda | H01L 21/67346 |
| | | | 414/217 |
| 2010/0136766 A1* | 6/2010 | Sakamoto | B23K 26/53 |
| | | | 257/E21.599 |
| 2013/0139966 A1 | 6/2013 | Chae et al. | |
| 2015/0299018 A1* | 10/2015 | Bhuyan | B23K 26/40 |
| | | | 65/29.18 |
| 2017/0036304 A1* | 2/2017 | Masuda | G02B 5/208 |
| 2018/0362387 A1* | 12/2018 | Wieland | C03C 23/0025 |
| 2021/0331961 A1* | 10/2021 | Alderman | B32B 17/06 |

FOREIGN PATENT DOCUMENTS

| | | |
|---|---|---|
| KR | 10-2013-0061513 A | 6/2013 |
| KR | 10-1378578 B1 | 3/2014 |
| KR | 102091355 B1 * | 3/2020 |

* cited by examiner

JIG FOR MANUFACTURING WINDOW AND METHOD OF MANUFACTURING WINDOW USING THE SAME

CROSS-REFERENCE TO RELATED APPLICATION

This application claims priority to and the benefit of Korean Patent Application No. 10-2021-0018085, filed on Feb. 9, 2021, the entire content of which is hereby incorporated by reference.

BACKGROUND

1. Field

Aspects of embodiments of the present disclosure relate to a jig for manufacturing a window and a method of manufacturing a window using the same.

2. Description of the Related Art

A display device may have a window disposed on an outermost part thereof. A window may provide a front surface on which a user input occurs. A window made of glass provides a user with a luxurious feeling and aesthetic sense regarding a display device.

SUMMARY

According to aspects of embodiments of the present disclosure, a jig for easily manufacturing a window, and a method of manufacturing a window using the same are provided.

According to another aspect of embodiments of the present disclosure, a jig used to manufacture a plurality of windows from a glass substrate is provided.

According to another aspect of embodiments of the present disclosure, a method of manufacturing a window using the jig is provided.

According to one or more embodiments, a jig includes: a lower plate including a plurality of cell regions and a peripheral region configured to divide the plurality of cell regions; an intermediate plate in which a plurality of openings corresponding to the plurality of cell regions are defined and which is disposed on the lower plate; and an upper plate disposed on the intermediate plate, wherein a glass substrate is fixed between the intermediate plate and the upper plate.

In an embodiment, a plurality of holes passing through the lower plate may be defined in each of the plurality of cell regions.

In an embodiment, each of the plurality of cell regions may provide a support surface recessed from the peripheral region.

In an embodiment, the intermediate plate may include: a first portion having a closed line shape and located outside the plurality of openings; and a second portion between the plurality of openings.

In an embodiment, the first portion may include: first support regions; and first passage regions having smaller thicknesses than the first support regions.

In an embodiment, the second portion may include: second support regions; and second passage regions having smaller thicknesses than the second support regions.

In an embodiment, the upper plate may include first regions corresponding to the plurality of cell regions, and a second region corresponding to the peripheral region, and a plurality of holes passing through the upper plate may be defined in each of the first regions.

In an embodiment, pre-cutting lines may be formed in each of the upper and lower surfaces of the glass substrate, and the pre-cutting lines may define a plurality of window regions corresponding to the plurality of openings.

In an embodiment, the lower plate may further include a plurality of support pins on a support surface of each of the plurality of cell regions.

In an embodiment, the lower plate, the intermediate plate, and the upper plate each may include any of Teflon, silicone, or stainless steel.

According to one or more embodiments, a method of manufacturing a window includes: providing a glass substrate in which pre-cutting lines are formed in each of upper and lower surfaces thereof, the pre-cutting lines defining a plurality of window regions; performing chemical etching on the glass substrate; and collecting a plurality of windows corresponding to the plurality of window regions and separated from the glass substrate.

In an embodiment, the chemical etching may be performed while the glass substrate is fixed to a jig.

In an embodiment, the jig may be immersed in an etchant tank.

In an embodiment, the jig may include: a lower plate including a plurality of cell regions and a peripheral region dividing the plurality of cell regions; an intermediate plate on the lower plate and including a plurality of openings corresponding to the plurality of cell regions; and an upper plate on the intermediate plate, wherein the glass substrate may be fixed between the intermediate plate and the upper plate.

In an embodiment, after the chemical etching, the glass substrate may be separated into the plurality of windows and dummy glasses corresponding to the intermediate plate.

In an embodiment, the dummy glasses may have an integral shape.

In an embodiment, the upper plate and the intermediate plate may be separated from the lower plate while being coupled to each other.

In an embodiment, the pre-cutting lines may be formed by irradiating the glass substrate with a laser beam.

In an embodiment, the jig may include any of plastic, Teflon, silicone, or stainless steel.

In an embodiment, depths of the pre-cutting lines may be about 10% to about 20% of a thickness of the glass substrate.

BRIEF DESCRIPTION OF THE DRAWINGS

The accompanying drawings are included to provide a further understanding of the inventive concept, and are incorporated in and constitute a part of this specification. The drawings illustrate some embodiments of the inventive concept and, together with the description, serve to explain principles of the inventive concept. In the drawings.

DETAILED DESCRIPTION

The present invention will be described more fully herein with reference to the accompanying drawings, in which some embodiments are shown. The present invention may, however, be embodied in many different forms, and should not be construed as limited to the embodiments set forth herein.

It is to be understood that when an element or layer is referred to as being "on," "connected to," or "coupled to" another element or layer, it may be directly on, connected, or coupled to the other element or layer, or one or more intervening elements or layers may be present.

Like reference numerals or symbols refer to like elements throughout. The thickness, ratio, and dimension of an element may be exaggerated for effective description of the technical contents. In the present specification, the term "and/or" includes any and all combinations of one or more of the associated listed items.

The terms "first," "second," etc., may be used to describe various elements, but the elements should not be limited by the terms. The terms are used for the purpose of distinguishing one component from another. For example, without departing from the scope of the present invention, the first component may be referred to as a second component, and, similarly, the second component may also be referred to as a first component. Singular expressions include plural expressions unless the context clearly indicates otherwise.

In addition, terms such as "below," "under," "above," "on," etc. are used to describe the relationship between the components shown in the drawings. The terms are relative concepts and are explained based on the directions indicated in the drawings.

The terms "comprise," "include," or "have" are intended to indicate the presence of a feature, number, step, action, component, part, or combination thereof described in the specification, one or more other features, numbers, or steps. It is to be understood that these terms do not preclude the existence or addition possibility of a feature, number, step, action, component, part, or combination thereof.

Unless otherwise defined, all terms (including technical and scientific terms) used herein have the same meaning as commonly understood by one of ordinary skill in the art to which this invention belongs. In addition, it is to be further understood that terms, such as those defined in commonly used dictionaries, should be interpreted as having a meaning that is consistent with their meaning in the context of the relevant art and will not be interpreted in an idealized or overly formal sense unless expressly defined herein.

Herein, embodiments of the inventive concept will be described with reference to the drawings.

Figure 1:
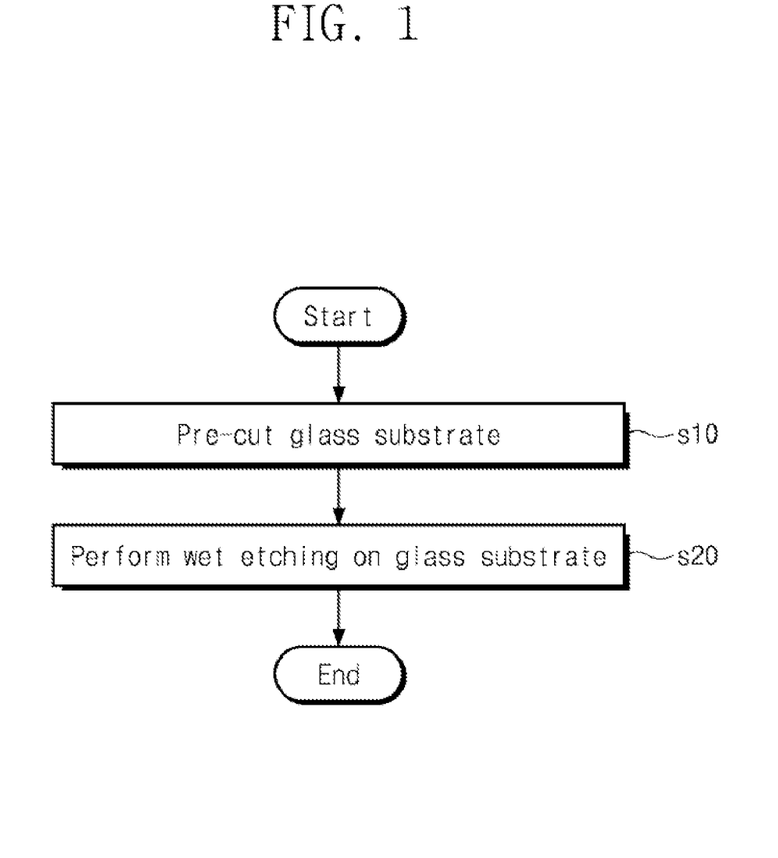
FIG. 1 is a flowchart illustrating a method of manufacturing a window according to an embodiment of the inventive concept.

FIG. 1 is a flowchart illustrating a method of manufacturing a window according to an embodiment of the inventive concept.

A method of manufacturing a window according to an embodiment may include pre-cutting a glass substrate (S10) and performing wet etching on a glass substrate (S20). In an embodiment, thereafter, the method may further include cleaning the cut glass substrate.

In an embodiment, the glass substrate may be a substrate for forming a plurality of windows. The glass substrate may be a chemically strengthened substrate. In an embodiment, the thickness of the glass substrate may be about 100 μm or less, and, in an embodiment, the thickness of the glass substrate may be about 30 μm to about 50 μm.

The pre-cutting (S10) may include irradiating the glass substrate with a laser beam. At least one of opposite surfaces of the glass substrate is irradiated with the laser beam. The laser beam forms pre-cutting lines. In an embodiment, an IR laser may be used to form the pre-cutting lines. In an embodiment, depths of the pre-cutting lines may correspond to about 10% to about 20% of the thickness of the glass substrate.

The performing of wet etching (S20) includes immersing, in an etchant, the glass substrate in which the pre-cutting lines have been formed. The glass substrate is etched by dipping the glass substrate in an etchant tank.

Even if the glass substrate is etched at the same rate overall, regions where the pre-cutting lines are formed are relatively thin, such that the glass substrate is separated into a plurality of pieces along the pre-cutting lines. Some of the plurality of pieces correspond to windows and others correspond to dummy glasses.

Figure 2A:
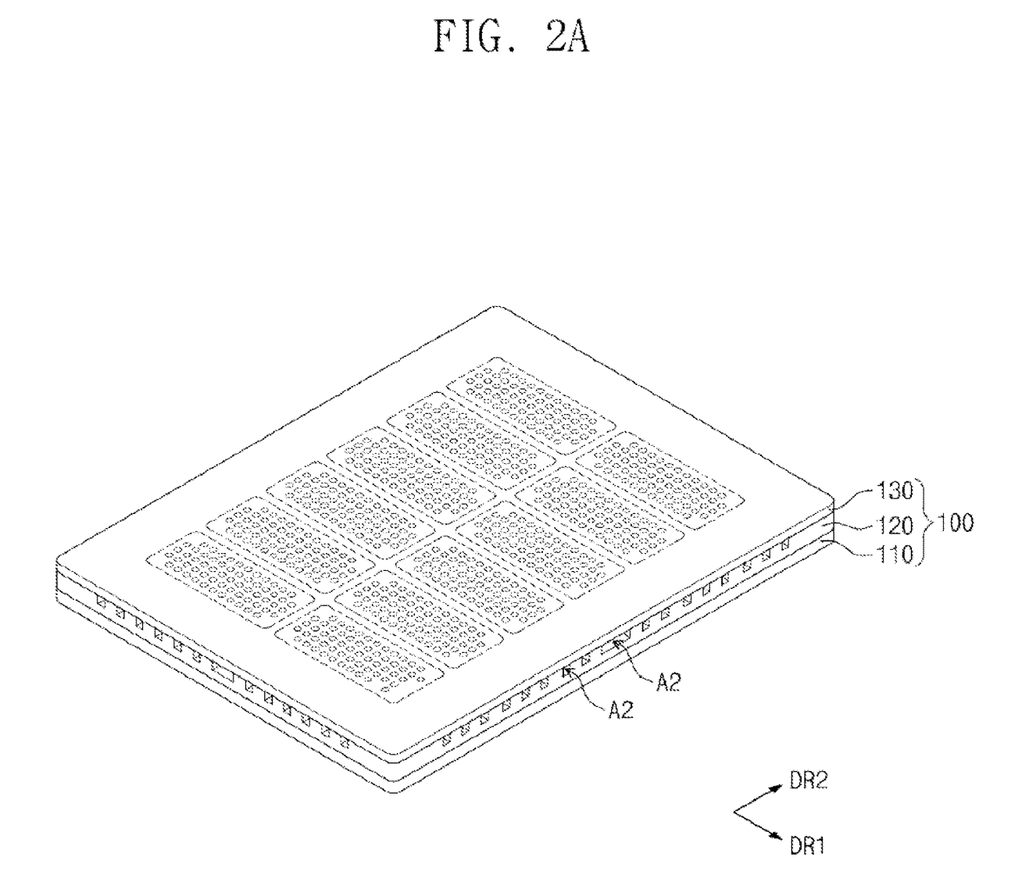
FIG. 2A is a perspective view of a jig according to an embodiment of the inventive concept.
Figure 2B:
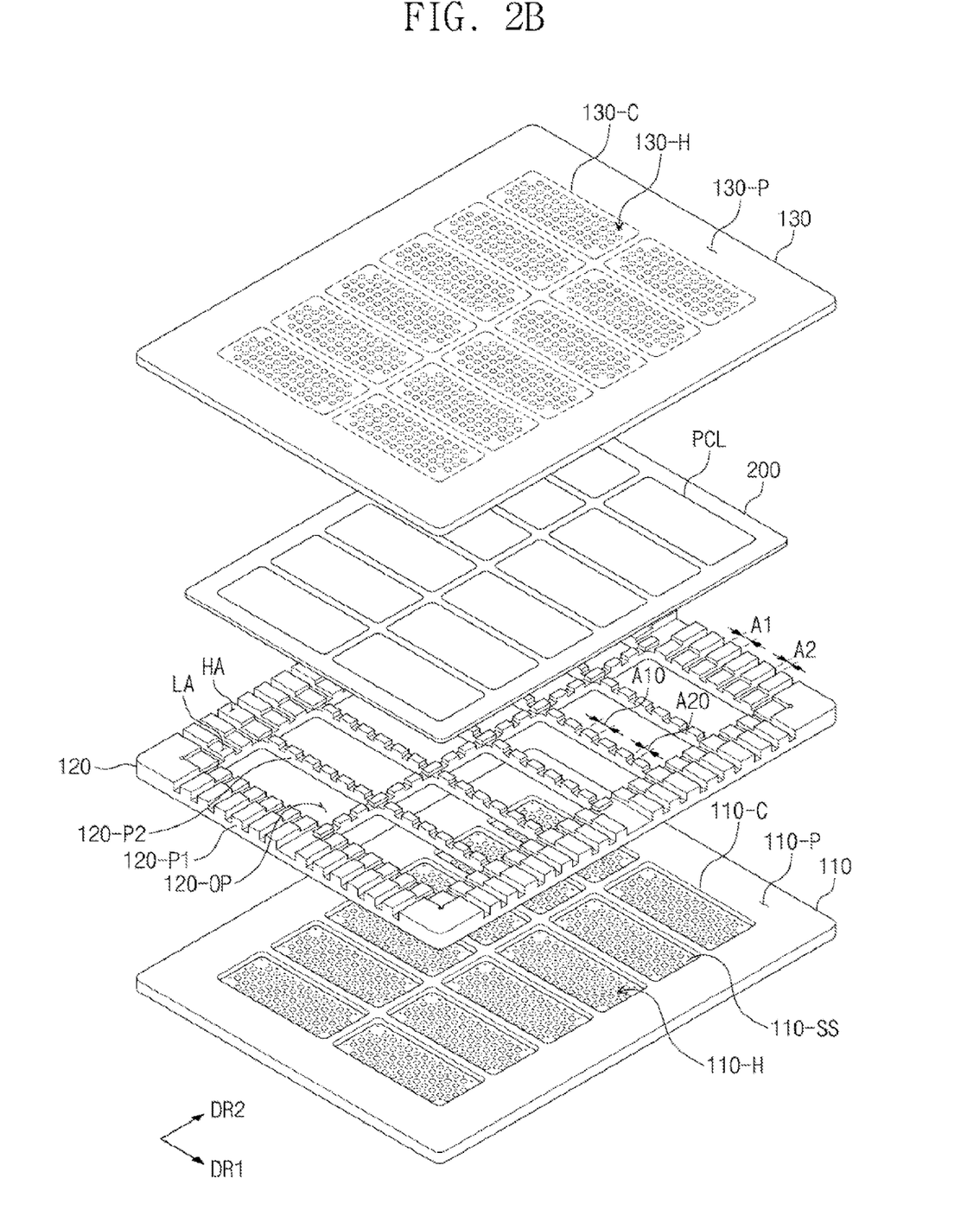
FIG. 2B is an exploded perspective view of a jig according to an embodiment of the inventive concept.
Figure 3A:
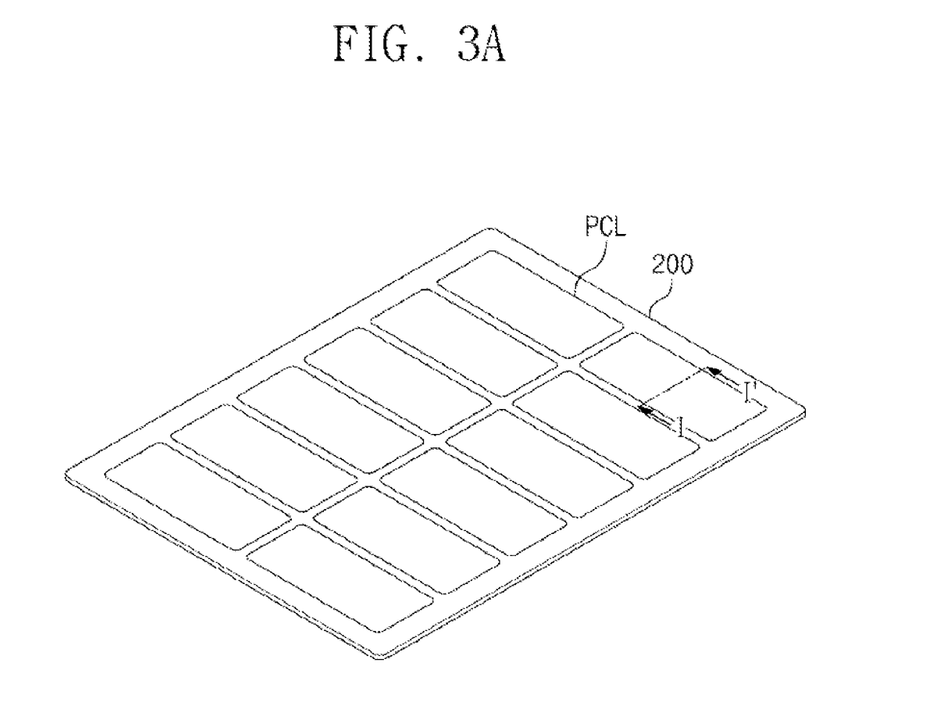
FIG. 3A is a perspective view of a glass substrate according to an embodiment of the inventive concept.
Figure 3B:
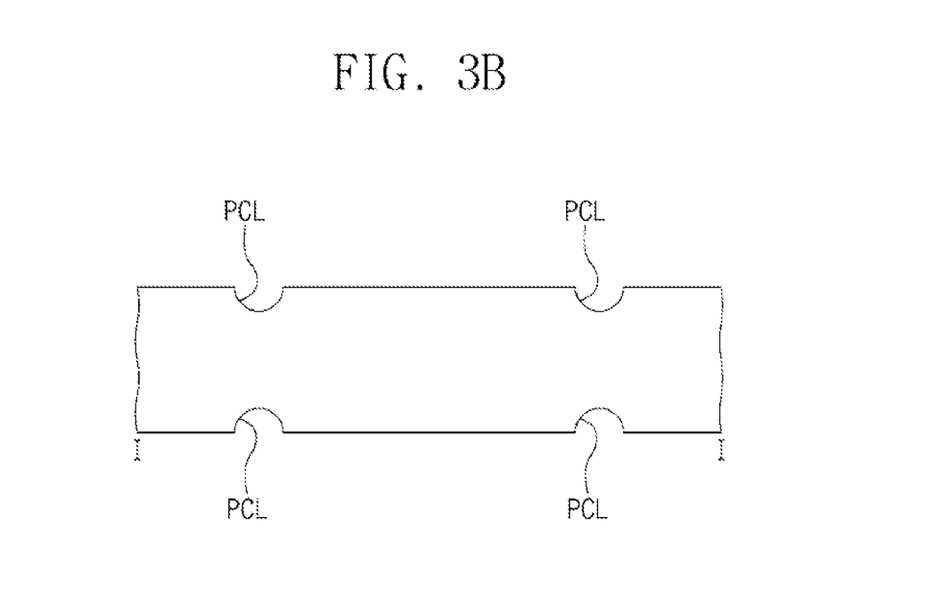
FIG. 3B is a cross-sectional view of a glass substrate according to an embodiment of the inventive concept, taken along the line I-I' of FIG. 3A.

In the performing of wet etching (S20), a jig is used to easily separate the plurality of windows and the dummy glasses. Herein, a jig according to an embodiment will be described. FIG. 2A is a perspective view of a jig according to an embodiment of the inventive concept; and FIG. 2B is an exploded perspective view of a jig according to an embodiment of the inventive concept. FIG. 3A is a perspective view of a glass substrate according to an embodiment of the inventive concept; and FIG. 3B is a cross-sectional view of a glass substrate according to an embodiment of the inventive concept, taken along the line I-I' of FIG. 3A.

As illustrated in FIGS. 2A and 2B, a jig 100 according to an embodiment includes a lower plate 110, an intermediate plate 120, and an upper plate 130. The intermediate plate 120 is disposed between the lower plate 110 and the upper plate 130. The lower plate 110, the intermediate plate 120, and the upper plate 130 may be coupled to each other. A coupling method or coupling structure is not particularly limited, and a coupling method or coupling structure, such as a magnetic structure, a magnet-metal structure, a protrusion-cavity coupling structure, etc., may be used as the coupling method or coupling structure.

The lower plate 110 includes a plurality of cell regions 110-C and a peripheral region 110-P that divides the plurality of cell regions. The plurality of cell regions 110-C and the peripheral region 110-P may be distinguished by a structural difference.

In an embodiment, a plurality of first holes 110-H penetrating the lower plate 110 may be defined in each of the plurality of cell regions 110-C. The plurality of first holes 110-H correspond to passages for an etchant. In an embodiment, the first holes 110-H may be arranged in a matrix form. However, in an embodiment of the inventive concept, the first holes 110-H may be omitted.

The plurality of cell regions 110-C and the peripheral region 110-P may be distinguished by a thickness difference. The plurality of cell regions 110-C may have a thickness less than or greater than that of the peripheral region 110-P.

The plurality of cell regions 110-C and the peripheral region 110-P may be distinguished by steps between support surfaces 110-SS. Steps recessed (or concave) corresponding to the plurality of cell regions 110-C may be defined on the support surfaces 110-SS of the lower plate 110.

The intermediate plate 120 is disposed on the lower plate 110. A plurality of openings 120-OP corresponding to the plurality of cell regions 110-C are defined in the intermediate plate 120. The intermediate plate 120 may be coupled to the lower plate 110.

The intermediate plate 120 includes a first portion 120-P1 disposed outside the plurality of openings 120-OP and having a closed line shape, and a second portion 120-P2 disposed between the plurality of openings. The second portion 120-P2 may include a portion extending in a first direction DR1 and a portion extending in a second direction DR2. In an embodiment, the first portion 120-P1 and the second portion 120-P2 may have an integral shape.

Each of the first portion 120-P1 and the second portion 120-P2 may include a support region and a passage region. The support region and the passage region may have different thicknesses.

The first portion 120-P1 may include first support regions A1 and first passage regions A2. The first support regions A1 and the first passage regions A2 may be alternately disposed.

Steps may be formed in the first portion 120-P1. In particular, steps are formed in the first support regions A1. A low region LA is disposed more inward than a high region HL. The low region LA supports a glass substrate 200. In an embodiment, depths of the steps may be substantially the same as the thickness of the glass substrate 200. The high region HL may support the upper plate 130, which will be described later.

The second portion 120-P2 may include second support regions A10 and second passage regions A20. The second support regions A10 and the second passage regions A20 may be alternately disposed. The second support regions A10 may support the glass substrate 200.

The first passage regions A2 correspond to passages through which the etchant flows into a side surface of the jig 100 in a state in which the jig 100 is coupled as illustrated in FIG. 2A. The second passage regions A20 correspond to passages through which the etchant flows between the cell regions 110-C.

The upper plate 130 may include first regions 130-C corresponding to the plurality of cell regions 110-C and second regions 130-P corresponding to the peripheral region 110-P. The first regions 130-C and the second regions 130-P may be distinguished by a structural difference. In an embodiment, a plurality of second holes 130-H penetrating the upper plate 130 may be defined in each of the plurality of first regions 130-C. The second holes 130-H correspond to passages for the etchant.

In a state in which the jig 100 is coupled, the glass substrate 200 is fixed between the intermediate plate 120 and the upper plate 130.

FIGS. 3A and 3B illustrate the glass substrate 200 that is fixed to the jig 100. As illustrated in FIG. 3A, pre-cutting lines PCL are formed in the glass substrate 200.

The pre-cutting lines PCL may be formed to correspond to the plurality of openings 120-OP of the intermediate plate 120 on a plane. The pre-cutting lines PCL define a plurality of window regions 200-W in the glass substrate 200.

As illustrated in FIG. 3B, the pre-cutting lines PCL may be formed in each of upper and lower surfaces of the glass substrate 200. A region in which the pre-cutting lines PCL are formed is thinner than a region in which the pre-cutting lines PCL are not formed.

Figure 4A:
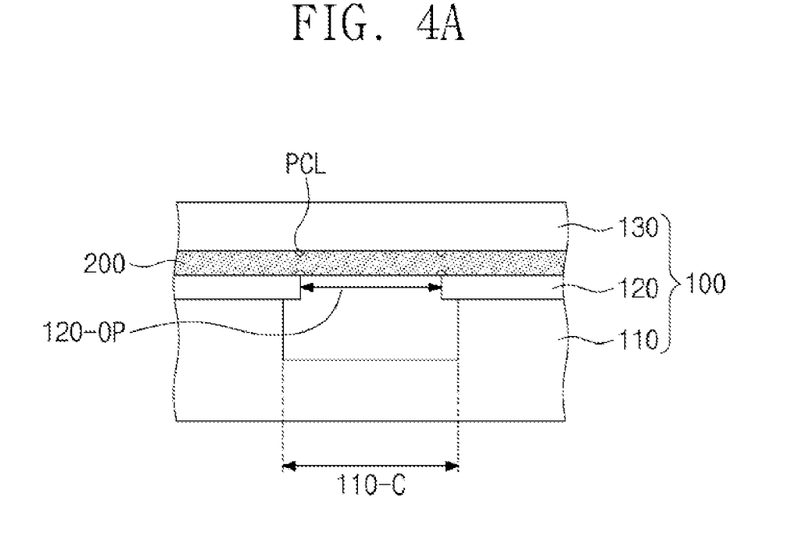
FIGS. 4A to 4C are diagrams illustrating a method of using a jig according to an embodiment of the inventive concept.
Figure 4B:
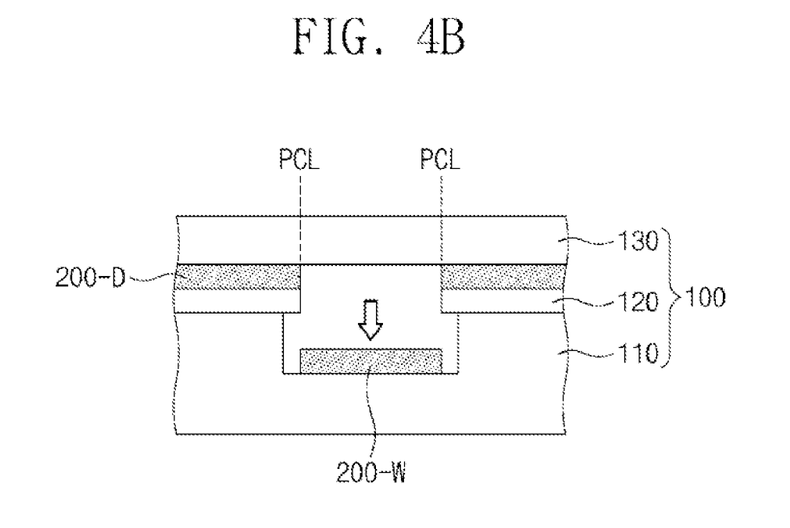
Figure 4C:
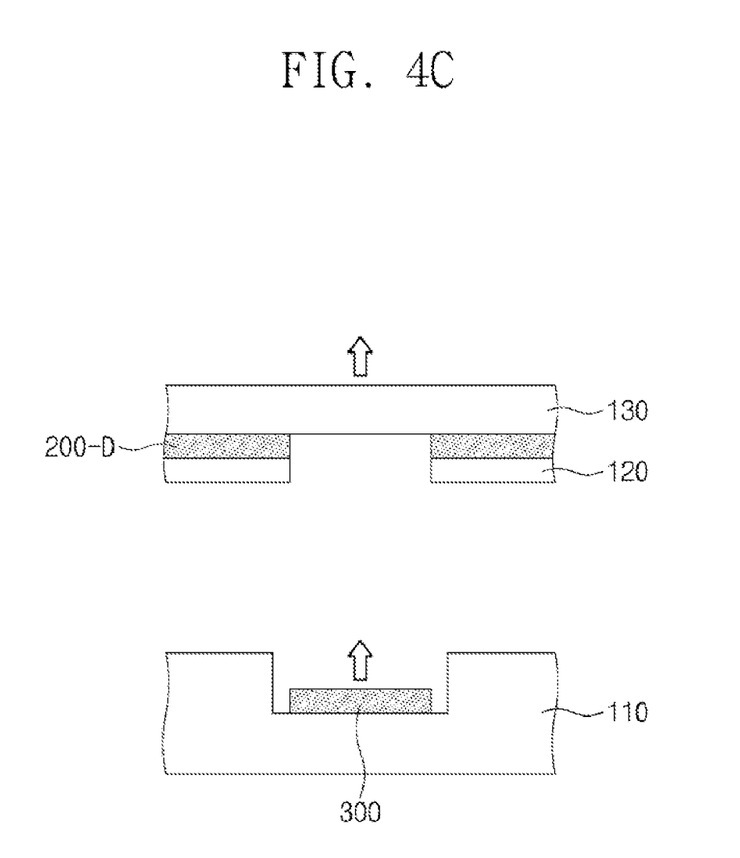

FIGS. 4A to 4C are diagrams illustrating a method of using a jig 100 according to an embodiment of the inventive concept. FIGS. 4A to 4C are illustrated based on a cross-section corresponding to one cell region 110-C.

In a state in which the glass substrate 200 is fixed between the intermediate plate 120 and the upper plate 130, as illustrated in FIG. 4A, the jig 100 may be immersed in an etchant tank. The etchant moves to the inside of the jig 100 through the first holes 110-H, the second holes 130-H, and the second regions A2 of the first portion 120-P1 described with reference to FIGS. 2A and 2B. In an embodiment, the glass substrate 200 is surrounded by the etchant, and the glass substrate is etched uniformly or substantially uniformly throughout.

In an embodiment, the lower plate 110, the intermediate plate 120, and the upper plate 130 may each include any of Teflon, silicone, or stainless steel having excellent etch resistance. Damage to the lower plate 110, the intermediate plate 120, and the upper plate 130 may be prevented or substantially prevented during the etching process. However, the above-described material is merely an example, and the lower plate 110, the intermediate plate 120, and the upper plate 130 may be manufactured using a material that is not etched by the etchant.

As illustrated in FIG. 4B, the relatively thin pre-cutting lines PCL are etched first, and the glass substrate 200 is separated into a plurality of parts along the pre-cutting lines PCL. A portion corresponding to the window region 200-W may be seated on the cell region 110-C by gravity.

A remaining portion 200-D (herein, dummy glasses) of the glass substrate 200 is still fixed between the intermediate plate 120 and the upper plate 130. When it is determined that sufficient etching has been completed, the jig 100 is removed from the etchant tank.

Thereafter, the dummy glasses 200-D and a window 300 corresponding to the window region 200-W are separated from the jig 100. As illustrated in FIG. 4C, the intermediate plate 120 and the upper plate 130, which are coupled to each other, are separated from the lower plate 110. In this case, the dummy glasses 200-D are separated together with an assembly of the intermediate plate 120 and the upper plate 130. In an embodiment, the dummy glasses 200-D may have a shape substantially similar to that of the intermediate plate 120 on a plane and may have an integral shape.

Thereafter, the windows 300 are collected from the lower plate 110.

Referring to FIG. 2B, the windows 300 are respectively collected from the plurality of cell regions 110-C. The dummy glasses 200-D and the windows 300 may be easily separated by using the jig 100 according to the present embodiment.

Figure 5A:
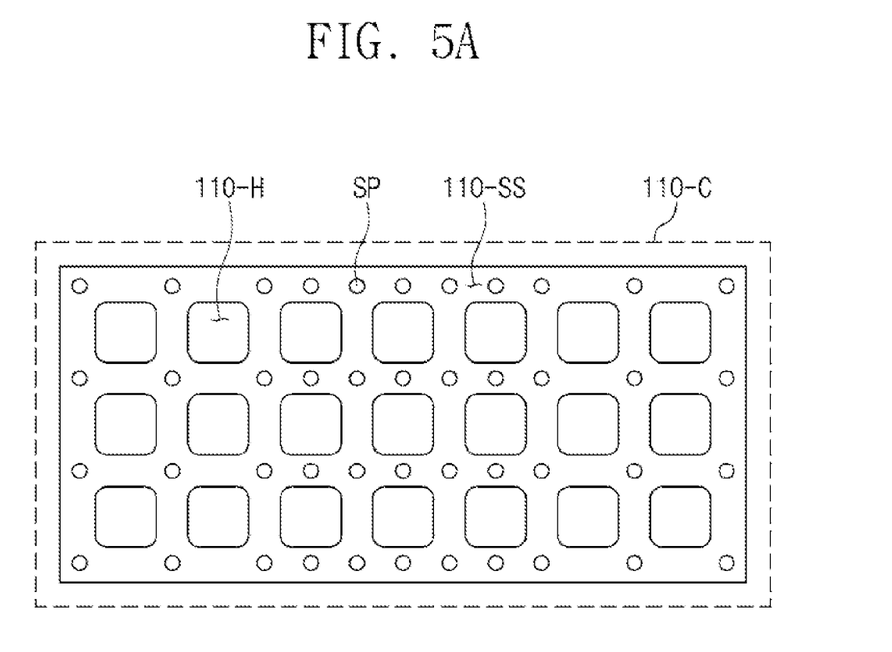
FIG. 5A is a plan view of a cell region of a lower plate according to an embodiment of the inventive concept.
Figure 5B:
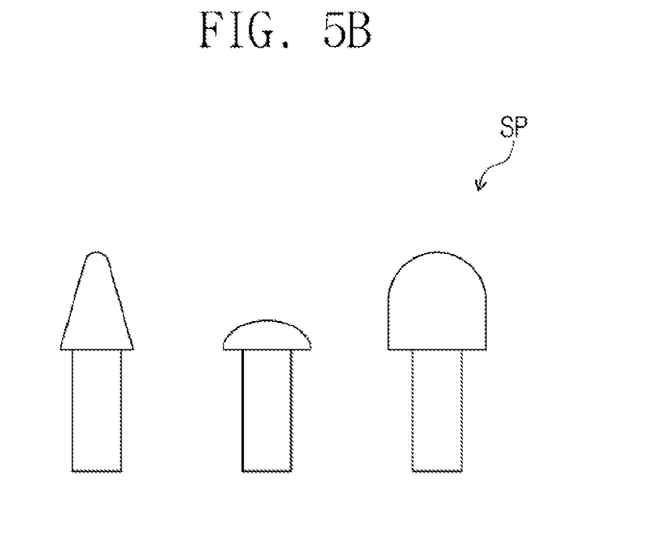
FIG. 5B is a side view of a support pin according to some embodiments of the inventive concept.

FIG. 5A is a plan view of a cell region 110-C of a lower plate 110 according to an embodiment of the inventive concept. FIG. 5B is a side view of a support pin SP according to some embodiments of the inventive concept. Herein, a further description of the same configuration as that described with reference to FIGS. 1 to 4C may be omitted.

As illustrated in FIG. 5A, the lower plate 110 may further include a plurality of support pins SP disposed on the support surface 110-SS of each of the cell regions 110-C. As illustrated in FIG. 4B, when the window region 200-W is seated on the support surface 110-SS, a difference in etch rate may occur between a region that overlaps the first holes 110-H and a region that does not overlap the first holes 110-H.

The support pins SP may separate the window region 200-W from the support surface 110-SS such that the etchant may be provided to the whole lower surface of the window region 200-W.

As illustrated in FIG. 5B, to prevent or substantially prevent contact damage to the window region 200-W, the contact surface of the support pin SP may have, in an embodiment, a curved shape. FIG. 5B illustrates, as some examples, that the support pin may have any of three shapes, but the shapes thereof are not particularly limited.

Figure 6A:
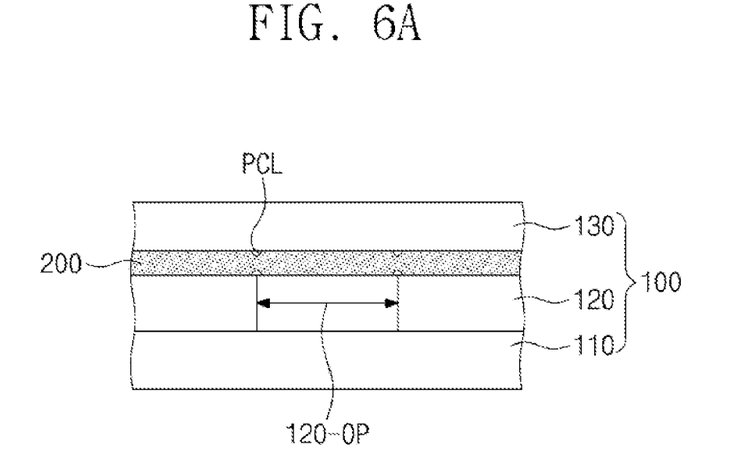
FIGS. 6A to 6C are diagrams illustrating a method of using a jig according to an embodiment of the inventive concept.
Figure 6B:
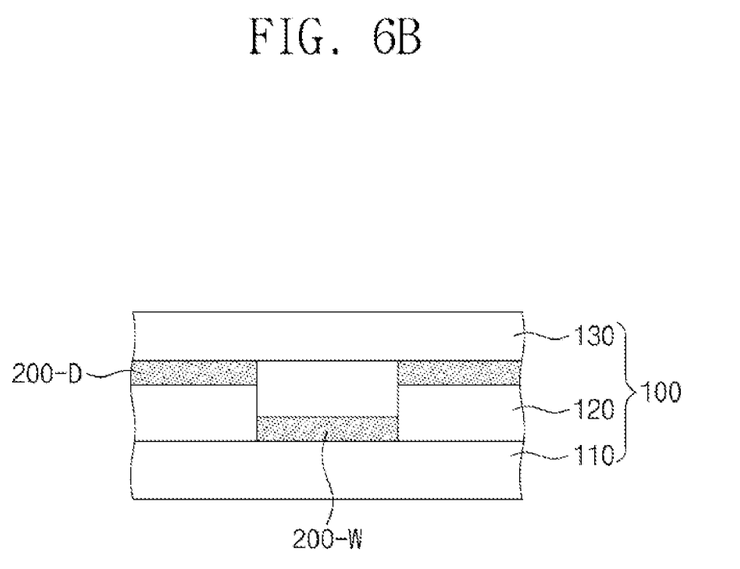
Figure 6C:
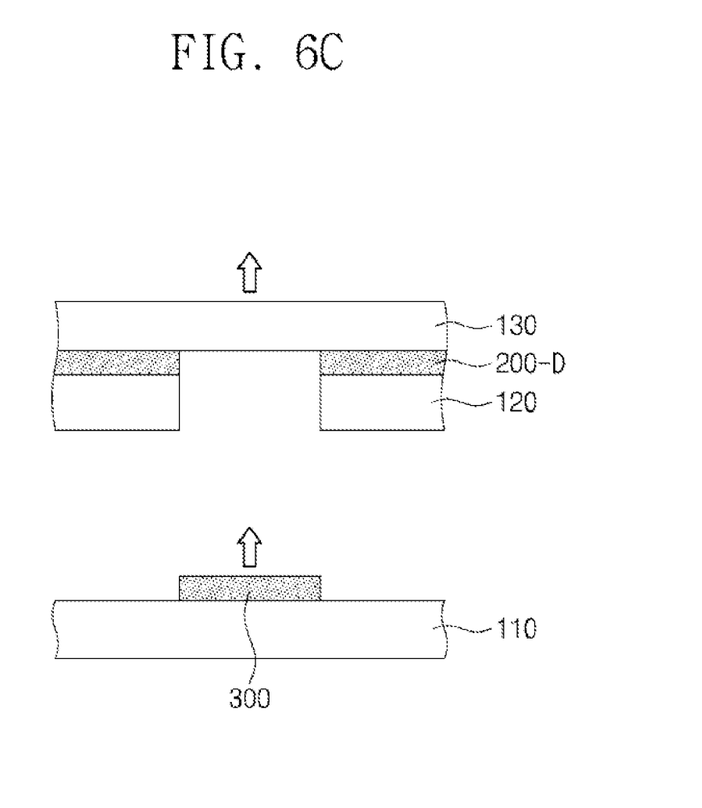

FIGS. 6A to 6C are diagrams illustrating a method of using a jig according to an embodiment of the inventive concept.

According to the present embodiment, a step may not be formed on the lower plate 110. As illustrated in FIG. 6B, the intermediate plate 120 coupled to the lower plate 110 may provide a seating space for the window region 200-W. It can be seen that the configuration in FIG. 6B is different from that in FIG. 4B in which the lower plate 110 provides a seating space for the window region 200-W.

As illustrated in FIG. 6C, the dummy glasses 200-D are separated together with an assembly of the intermediate plate 120 and the upper plate 130. Thereafter, the windows 300 may be collected from the lower plate 110.

According to embodiments of the inventive concept, a jig which makes it easy to remove dummy glasses and also easy to collect windows is provided.

Further, according to embodiments of the inventive concept, a method of manufacturing a window does not cause cracks in windows because a glass substrate is cut through two operations.

Although some embodiments of the present invention have been described herein, it is to be understood that the present invention should not be limited to these embodiments, but various changes and modifications can be made by one of ordinary skill in the art within the spirit and scope of the present invention as herein claimed.

What is claimed is:

1. A method of manufacturing a window, the method comprising:
providing a glass substrate in which pre-cutting lines are formed in each of upper and lower outer surfaces thereof, the pre-cutting lines defining a plurality of window regions;
performing chemical etching on the glass substrate so as to separate the glass substrate, at the pre-cutting lines, into a plurality of windows corresponding to the plurality of window regions; and
collecting the plurality of windows corresponding to the plurality of window regions and separated from the glass substrate.

2. The method of claim 1, wherein the chemical etching is performed while the glass substrate is fixed to a jig.

3. The method of claim 2, wherein the jig is immersed in an etchant tank.

4. The method of claim 2, wherein the jig comprises any of plastic, Teflon, silicone, or stainless steel.

5. The method of claim 2, wherein the jig comprises:
a lower plate comprising a plurality of cell regions and a peripheral region dividing the plurality of cell regions;
an intermediate plate on the lower plate and comprising a plurality of openings corresponding to the plurality of cell regions; and
an upper plate on the intermediate plate,
wherein the glass substrate is fixed between the intermediate plate and the upper plate.

6. The method of claim 5, wherein, after the chemical etching, the glass substrate is separated into the plurality of windows and dummy glasses corresponding to the intermediate plate.

7. The method of claim 6, wherein the dummy glasses have an integral shape.

8. The method of claim 6, wherein the upper plate and the intermediate plate are separated from the lower plate while being coupled to each other.

9. The method of claim 1, wherein the pre-cutting lines are formed by irradiating the glass substrate with a laser beam.

10. The method of claim 1, wherein depths of the pre-cutting lines are about 10% to about 20% of a thickness of the glass substrate.

* * * * *